Dec. 21, 1926.
F. O. DELO
PIPE CLEANER
Filed August 14, 1922
1,611,820
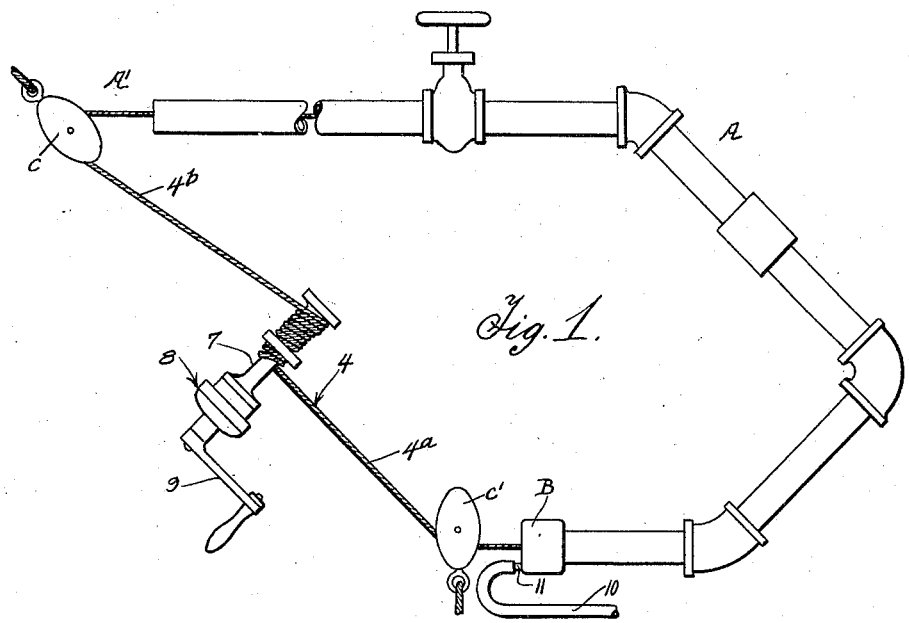
Fig. 1.
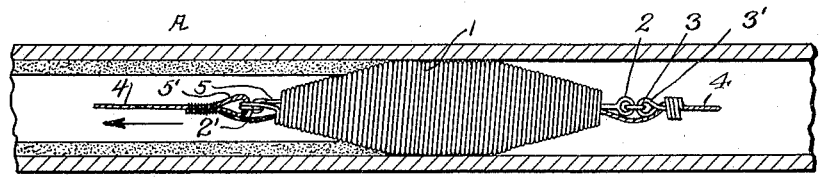
Fig. 2.
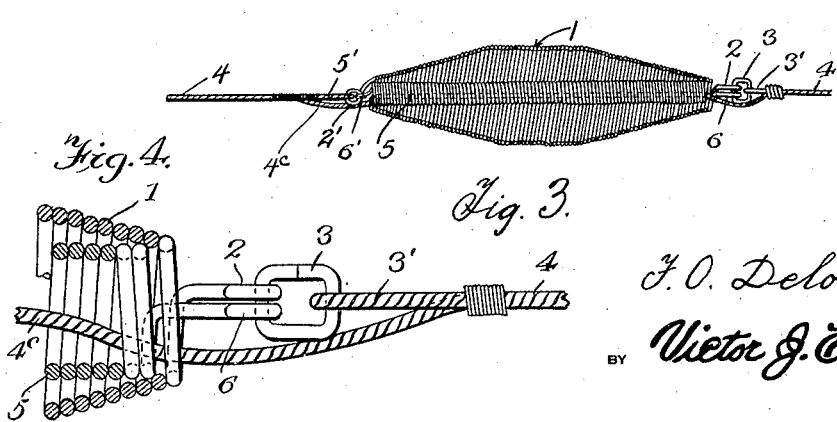
Fig. 4.
Fig. 3.
F. O. Delo
INVENTOR
BY Victor J. Evans
ATTORNEY Patented Dec. 21, 1926.

1,611,820

UNITED STATES PATENT OFFICE.

FRED OLIVER DELO, OF DUQUESNE, PENNSYLVANIA, ASSIGNOR TO HENRIETTA DELO AND CHARLOTTE DELO, BOTH OF DUQUESNE, PENNSYLVANIA.

PIPE CLEANER.

Application filed August 14, 1922. Serial No. 581,738.

This invention relates to cleaning means, and more particularly to means specially adapted for cleaning out water pipes.

One of the main objects of the invention is to provide means of simple construction and operation whereby corrosion may be readily removed from the inner surface of water pipes. A further object is to provide means of the character stated which will readily pass through gate valves, elbows, and the various connections of a piping system. Another object is to provide a device of the character stated which may be readily produced at small cost. Further objects will appear from the detailed description.

In the drawings:—

Figure 1 is a top plan view of the device as used.

Figure 2 is an elevation of the device as used, a portion of piping being shown in section.

Figure 3 is a section through the device.

Fig. 4 is a fragmentary sectional view of the right hand end of the device illustrated in Fig. 3.

The device includes a cleaning or scraping member 1 which is formed of resilient wire coiled to provide a body which tapers toward each end. The ends of the resilient wire, from which the scraping member is formed, terminates in eyelets 2 and 2'. The eyelet 2 is secured to an end 3' of the cable 4 through the medium of a link 3 and the eyelet 2' is secured to an end 4' of the cable 4 as at 5'. A cylindrical contraction spring 5 is confined in the scraper member 1 and has one end thereof secured to the link 3 as at 6 and the opposite end thereof secured to the eyelet 2' as at 6'.

In practice a section of the pipe line A is disconnected from the remainder of the pipe line, and a pipe coupling B is secured on one end of line A. After this has been done, portion 4ª of cable 4 is passed through pipe line A and is secured to one end of member 1, the other end of this member being secured to the end of portion 4ᵇ of the cable. Portion 4ᵇ of the cable is passed about a sheave mounted in a block c anchored at one end A' of pipe line A, portion 4ª of the cable being passed about a sheave mounted in a block c' anchored adjacent to a pipe coupling B. The intermediate portion of the cable is wound upon a drum 7 of a windlass 8 mounted between the sheaves c and c'. By turning drum 7, by means of crank 9, member 1 is pulled through the pipe line A in either direction preferred. During its travel through the pipe line this member serves to effectually scrape the inner surface of the pipe so as to remove therefrom all corrosion (Fig. 2), and this foreign matter is discharged from end A' of the pipe by the action of a stream of water which enters the pipe by means of a hose 10 which may be connected to a hydrant or other suitable source of supply of water under pressure, this hose being connected to a nipple 11 of a pipe coupling B. Due to its resiliency and to its taper, member 1 can be readily drawn through the pipe line and can be readily extended and reduced in diameter so as to pass through gate valves, elbows, and other devices inserted in the pipe line. In the event that member 1 breaks, the cable ends will remain secured to the ends of spring 5 thus permitting member 1 to be withdrawn from the pipe line and replaced. This provides very simple and efficient means for effectually scraping out pipe lines so as to remove therefrom all corrosion and foreign materials, and this means is particularly well adapted for use in connection with pipe lines of relatively small interior diameter. This device can be readily produced and applied at very small cost and has been found in practice to be highly efficient.

As an additional precaution against loss of the device in the event of breakage, I provide a supplemental length of cable 4ᶜ the ends of which are secured to the ends of cable 4 in any suitable or preferred manner. Cable 4ᶜ passes through spring 5, this cable being normally slack and of such length as to permit member 1 and spring 5 to be distorted or stretched longitudinally sufficiently to enable member 1 to pass readily through valves, elbows and other connections in pipe line A. As will be clear from Fig. 3, spring 5, due to its inherent resiliency, also acts through tension to resist longitudinal extension of member 1 opposing radial contraction of this member and ensuring close contact of the coils of the scraping member with the inner surface of the pipe.

What I claim is:—

1. In a device of the character described, an outer resilient member tapering from its central portion toward each end, a contractile member positioned within the resilient member, means connecting the ends of the contractile member to the ends of said resilient member said contractile member tending to compress the resilient member longitudinally and resist contraction radially of the resilient member while permitting extension of the resilient member in the direction of its axis under tension, and means for forcing said contractile member and said resilient member through a pipe.

2. A pipe cleaner including a cable adapted to be drawn through a pipe, means for drawing the cable through the pipe, a resilient member, means for connecting the opposite ends of the resilient member to the ends of the cable, a contractile member arranged in the resilient member, and means connecting the end portions of the contractile member to the said ends of the cable.

In testimony whereof I affix my signature.

FRED OLIVER DELO.